United States Patent
Vallius et al.

(10) Patent No.: US 9,910,276 B2
(45) Date of Patent: Mar. 6, 2018

(54) DIFFRACTIVE OPTICAL ELEMENTS WITH GRADED EDGES

(71) Applicant: Microsoft Technology Licensing, LLC, Redmond, WA (US)

(72) Inventors: Tuomas Vallius, Espoo (FI); Lauri Sainiemi, Espoo (FI); Tapani Levola, Tampere (FI); Marco Mattila, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 14/788,174

(22) Filed: Jun. 30, 2015

(65) Prior Publication Data
US 2017/0003504 A1    Jan. 5, 2017

(51) Int. Cl.
| | | |
|---|---|---|
| G02B 27/01 | (2006.01) |
| G02B 27/42 | (2006.01) |
| G02B 27/00 | (2006.01) |
| G02B 5/18 | (2006.01) |

(52) U.S. Cl.
CPC ....... *G02B 27/0101* (2013.01); *G02B 5/1819* (2013.01); *G02B 5/1852* (2013.01);
(Continued)

(58) Field of Classification Search
CPC ............ G02B 27/0101; G02B 27/0081; G02B 27/0172; G02B 27/4205; G02B 27/4272;
(Continued)

(56) References Cited

U.S. PATENT DOCUMENTS 3,980,883 A * 9/1976 Franks ..................... G21K 1/06
                                                      378/145
5,061,025 A   10/1991 Debesis
(Continued)

FOREIGN PATENT DOCUMENTS

| CN | 100433043 C | 10/2007 |
| CN | 102902060 A | 1/2013 |

(Continued)

OTHER PUBLICATIONS

"International Search Report & Written Opinion Issued in PCT Application No. PCT/US2016/039705", dated Sep. 15, 2016, (13 Pages total).

(Continued)

*Primary Examiner* — Marin Pichler
(74) *Attorney, Agent, or Firm* — Mark K. Young; Mayer & Williams PC

(57) ABSTRACT

In an optical system that includes a waveguide with multiple diffractive optical elements (DOEs) incorporating diffraction gratings, light exiting a trailing edge of an upstream DOE enters a leading edge of a downstream DOE. One or more of the DOEs may include a leading and/or a trailing edge that have a graded profile. At a graded trailing edge of an upstream DOE, grating height smoothly decreases from full height to shallow height as a function of the proximity to the trailing edge. At a graded leading edge of the downstream DOE grating height smoothly increases from shallow height to full height as a function of distance away from the leading edge. By reducing a sharp boundary at the interface between the upstream and downstream DOEs, the graded profiles of the DOE edges enable optical resolution to be maintained decreasing sensitivity to misalignment between the DOEs that may occur during manufacturing.

8 Claims, 11 Drawing Sheets

(52) U.S. Cl.
CPC ..... *G02B 27/0081* (2013.01); *G02B 27/0172* (2013.01); *G02B 27/4205* (2013.01); *G02B 27/4272* (2013.01); *G02B 2027/0125* (2013.01); *G02B 2027/0178* (2013.01)

(58) Field of Classification Search
CPC .. G02B 5/1814; G02B 5/1819; G02B 5/1823; G02B 5/1866; G02B 5/1842; G02B 6/0016; G02B 6/0033; G02B 2027/011; G02B 2027/0123; G02B 2027/0125; G02B 2027/0178; G02B 2027/0174; G02B 23/125; G02B 5/1852
USPC .................................................. 359/567, 569
See application file for complete search history.

(56) References Cited

U.S. PATENT DOCUMENTS

| | | | |
|---|---|---|---|
| 5,218,471 A | 6/1993 | Swanson et al. | |
| 5,224,198 A | 6/1993 | Jachimowicz | |
| 5,340,637 A | 8/1994 | Okai et al. | |
| 5,907,427 A | 5/1999 | Scalora et al. | |
| 6,046,541 A | 4/2000 | Valliath | |
| 6,147,725 A | 11/2000 | Yuuki | |
| 6,232,044 B1 | 5/2001 | Gibbons et al. | |
| 6,259,561 B1 | 7/2001 | George et al. | |
| 6,410,213 B1 | 6/2002 | Raguin | |
| 6,700,552 B2 | 3/2004 | Kollin et al. | |
| 6,833,956 B2 | 12/2004 | Lee | |
| 6,836,365 B2 | 12/2004 | Goto | |
| 6,873,463 B2 | 3/2005 | Nakai | |
| 6,909,546 B2 | 6/2005 | Hirai | |
| 6,950,227 B2 | 9/2005 | Schrader | |
| 6,990,275 B2 | 1/2006 | Kersten et al. | |
| 7,123,415 B2 | 10/2006 | Mercer | |
| 7,129,028 B2 | 10/2006 | Koeda et al. | |
| 7,224,854 B2 | 5/2007 | Ellwood, Jr. | |
| 7,236,251 B2 | 6/2007 | Takaoka | |
| 7,339,738 B1 | 3/2008 | Carr | |
| 7,391,524 B1 | 6/2008 | Chen et al. | |
| 7,483,604 B2 | 1/2009 | Levola | |
| 7,492,517 B2 | 2/2009 | McGrew | |
| 7,525,672 B1 | 4/2009 | Chen et al. | |
| 7,565,041 B2 | 7/2009 | Little et al. | |
| 7,576,866 B2 | 8/2009 | Ohkubo | |
| 7,627,018 B1 | 12/2009 | Guilfoyle | |
| 7,710,628 B2 | 5/2010 | Morizono et al. | |
| 7,719,675 B2 | 5/2010 | Grygier et al. | |
| 7,738,746 B2 | 6/2010 | Charters et al. | |
| 7,959,308 B2 | 6/2011 | Freeman et al. | |
| 7,981,591 B2 | 7/2011 | Li et al. | |
| 8,152,307 B2 | 4/2012 | Duelli et al. | |
| 8,160,411 B2 | 4/2012 | Levola et al. | |
| 8,208,191 B2 | 6/2012 | Gan et al. | |
| 8,233,204 B1 | 7/2012 | Robbins | |
| 8,314,993 B2 | 11/2012 | Levola | |
| 8,376,548 B2 | 2/2013 | Schultz | |
| 8,463,080 B1 | 6/2013 | Anderson et al. | |
| 8,466,953 B2 | 6/2013 | Levola | |
| 8,488,246 B2 | 7/2013 | Border et al. | |
| 8,508,848 B2 | 8/2013 | Saarikko | |
| 8,548,290 B2 | 10/2013 | Travers | |
| 8,579,492 B2 | 11/2013 | Epstein et al. | |
| 8,593,734 B2 | 11/2013 | Laakkonen | |
| 8,675,182 B2 | 3/2014 | Bamji | |
| 8,681,184 B2 | 3/2014 | Seesselberg | |
| 8,699,137 B2 | 4/2014 | McGrew | |
| 8,736,963 B2 | 5/2014 | Robbins et al. | |
| 8,749,796 B2 | 6/2014 | Pesach et al. | |
| 8,792,169 B2 | 7/2014 | Jiang et al. | |
| 8,830,584 B2 | 9/2014 | Saarikko | |
| 9,671,615 B1 | 6/2017 | Vallius | |
| 2001/0015851 A1 | 8/2001 | Danziger | |
| 2001/0033716 A1 | 10/2001 | Fukutomi | |
| 2001/0036012 A1 | 11/2001 | Nakai | |
| 2002/0080491 A1 | 6/2002 | Goto | |
| 2003/0107787 A1 | 6/2003 | Bablumyan | |
| 2004/0170356 A1 | 9/2004 | Iazikov | |
| 2004/0184147 A1 | 9/2004 | Parikka | |
| 2004/0218172 A1 | 11/2004 | DeVerse et al. | |
| 2004/0233534 A1 | 11/2004 | Nakanishi | |
| 2005/0002611 A1 | 1/2005 | Levola | |
| 2005/0180674 A1 | 8/2005 | Ellwood, Jr. | |
| 2005/0189315 A1 | 9/2005 | Knight et al. | |
| 2006/0056028 A1 | 3/2006 | Wildnauer | |
| 2007/0008624 A1 | 1/2007 | Hirayama | |
| 2007/0188837 A1 | 8/2007 | Shimizu et al. | |
| 2007/0201795 A1 | 8/2007 | Rice et al. | |
| 2007/0242253 A1 | 10/2007 | Visser et al. | |
| 2007/0291362 A1 | 12/2007 | Hill | |
| 2008/0043334 A1 | 2/2008 | Itzkovitch | |
| 2008/0138013 A1 | 6/2008 | Parriaux | |
| 2008/0212921 A1 | 9/2008 | Gaylord | |
| 2008/0297731 A1 | 12/2008 | Powell et al. | |
| 2009/0009486 A1 | 1/2009 | Sato | |
| 2009/0040607 A1 | 2/2009 | Amako | |
| 2009/0128911 A1* | 5/2009 | Itzkovitch | G02B 5/1866 359/575 |
| 2009/0180166 A1 | 7/2009 | Hefetz et al. | |
| 2009/0245730 A1 | 10/2009 | Kleemann | |
| 2009/0257106 A1 | 10/2009 | Tan | |
| 2009/0303599 A1 | 10/2009 | Levola | |
| 2010/0079865 A1 | 4/2010 | Saarikko | |
| 2010/0134534 A1 | 6/2010 | Seesselberg | |
| 2010/0149073 A1 | 6/2010 | Chaum et al. | |
| 2010/0177388 A1* | 7/2010 | Cohen | G02B 6/0038 359/566 |
| 2010/0231693 A1 | 9/2010 | Levola | |
| 2010/0232016 A1 | 9/2010 | Landa | |
| 2010/0277803 A1 | 11/2010 | Pockett | |
| 2010/0284085 A1 | 11/2010 | Laakkonen | |
| 2010/0296163 A1 | 11/2010 | Saarikko | |
| 2010/0315719 A1 | 12/2010 | Saarikko | |
| 2010/0321781 A1 | 12/2010 | Levola | |
| 2011/0002143 A1 | 1/2011 | Saarikko et al. | |
| 2011/0019874 A1 | 1/2011 | Jarvenpaa | |
| 2011/0038049 A1 | 2/2011 | Vallius | |
| 2011/0096401 A1 | 4/2011 | Levola | |
| 2011/0115733 A1 | 5/2011 | Shih | |
| 2011/0261366 A1 | 10/2011 | Tearney | |
| 2012/0019647 A1 | 1/2012 | Kempe et al. | |
| 2012/0075168 A1 | 3/2012 | Osterhout et al. | |
| 2012/0120365 A1 | 5/2012 | Legerton | |
| 2012/0224062 A1 | 9/2012 | Lacoste | |
| 2013/0051730 A1 | 2/2013 | Travers | |
| 2013/0077049 A1 | 3/2013 | Bohn | |
| 2013/0100362 A1 | 4/2013 | Saeedi et al. | |
| 2013/0135193 A1 | 5/2013 | Fike, III | |
| 2013/0242392 A1 | 9/2013 | Amirparviz et al. | |
| 2013/0250430 A1 | 9/2013 | Robbins et al. | |
| 2013/0261782 A1 | 10/2013 | Becken | |
| 2013/0314793 A1 | 11/2013 | Robbins | |
| 2013/0322810 A1 | 12/2013 | Robbins | |
| 2014/0002608 A1 | 1/2014 | Atwell | |
| 2014/0043689 A1 | 2/2014 | Mason | |
| 2014/0104665 A1 | 4/2014 | Popovich et al. | |
| 2014/0140654 A1 | 5/2014 | Brown et al. | |
| 2014/0168167 A1 | 6/2014 | Chou | |
| 2014/0168260 A1 | 6/2014 | O'Brien et al. | |
| 2014/0185142 A1 | 7/2014 | Gupta et al. | |
| 2014/0217385 A1 | 8/2014 | Gaertner et al. | |
| 2014/0240613 A1 | 8/2014 | Bohn et al. | |
| 2014/0240834 A1 | 8/2014 | Mason | |
| 2014/0240843 A1 | 8/2014 | Kollin | |
| 2014/0293434 A1 | 10/2014 | Cheng | |
| 2014/0300695 A1 | 10/2014 | Smalley et al. | |
| 2015/0034591 A1* | 2/2015 | Vink | G02B 5/008 216/24 |
| 2015/0083917 A1 | 3/2015 | Wyrwas | |
| 2015/0092042 A1 | 4/2015 | Fursich | |
| 2015/0108479 A1 | 4/2015 | Brinkley | |
| 2015/0185475 A1 | 7/2015 | Saarikko | |
| 2015/0234477 A1 | 8/2015 | Abovitz | |
| 2015/0234491 A1 | 8/2015 | Liu | |

(56) References Cited

U.S. PATENT DOCUMENTS

| | | | |
|---|---|---|---|
| 2015/0277116 A1 | 10/2015 | Richards | |
| 2015/0331544 A1 | 11/2015 | Bergstrom | |
| 2015/0355394 A1* | 12/2015 | Valera | G02B 5/1828 359/571 |
| 2015/0382465 A1 | 12/2015 | Steyn | |
| 2016/0018637 A1 | 1/2016 | Sparks | |
| 2016/0026253 A1 | 1/2016 | Bradski | |
| 2016/0116739 A1 | 4/2016 | TeKolste | |
| 2016/0231570 A1 | 8/2016 | Levola | |
| 2016/0234485 A1 | 8/2016 | Robbins | |
| 2016/0291405 A1 | 10/2016 | Frisken | |
| 2016/0327789 A1 | 11/2016 | Klug | |
| 2016/0334635 A1 | 11/2016 | Ushigome | |
| 2017/0003504 A1 | 1/2017 | Vallius | |
| 2017/0003505 A1 | 1/2017 | Vallius | |
| 2017/0031171 A1 | 2/2017 | Vallius | |
| 2017/0034435 A1 | 2/2017 | Vallius | |
| 2017/0059879 A1 | 3/2017 | Vallius | |
| 2017/0102543 A1 | 4/2017 | Vallius | |
| 2017/0102544 A1 | 4/2017 | Vallius | |
| 2017/0122725 A1 | 5/2017 | Yeoh | |
| 2017/0123208 A1 | 5/2017 | Vallius | |
| 2017/0124928 A1 | 5/2017 | Edwin | |
| 2017/0131460 A1 | 5/2017 | Lin | |
| 2017/0131545 A1 | 5/2017 | Wall | |
| 2017/0131546 A1 | 5/2017 | Woltman | |
| 2017/0131551 A1 | 5/2017 | Robbins | |
| 2017/0139210 A1 | 5/2017 | Vallius | |

FOREIGN PATENT DOCUMENTS

| | | |
|---|---|---|
| CN | 103677448 A | 3/2014 |
| EP | 2163924 A1 | 3/2010 |
| EP | 2752691 A1 | 7/2014 |
| EP | 2887119 A1 | 6/2015 |
| GB | 2495398 A | 4/2013 |
| JP | S6218502 A | 1/1987 |
| WO | 2004055556 A1 | 7/2004 |
| WO | 2004109349 A2 | 12/2004 |
| WO | 2006064334 A1 | 6/2006 |
| WO | 2006132614 A1 | 12/2006 |
| WO | 2007141589 A1 | 12/2007 |
| WO | 2008038058 A1 | 4/2008 |
| WO | 2008081070 A1 | 7/2008 |
| WO | 2008148927 A1 | 12/2008 |
| WO | 2009077803 A1 | 6/2009 |
| WO | 2009101236 A1 | 8/2009 |
| WO | 2009101238 A1 | 8/2009 |
| WO | 2010062481 A1 | 1/2011 |
| WO | 2012169889 A1 | 12/2012 |
| WO | 2013033274 A1 | 3/2013 |
| WO | 2013144565 A1 | 10/2013 |
| WO | 2014019558 A1 | 2/2014 |
| WO | 2015063808 A1 | 5/2015 |
| WO | 2016130358 A1 | 8/2016 |

OTHER PUBLICATIONS

"International Search Report and Written Opinion Issued in PCT Application No. PCT/US2016/038857", dated Sep. 28, 2016, (16 Pages total).

"International Search Report and Written Opinion Issued in PCT Application No. PCT/US2016/039706", dated Oct. 6, 2016, (13 Pages total).

"International Search Report and Written Opinion Issued in PCT Application No. PCT/US2016/044947", dated Oct. 11, 2016, (14 Pages total).

"International Search Report and Written Opinion Issued in PCT Application No. PCT/US2016/037460", dated Oct. 24, 2016, (12 Pages total).

Platte, et al, "Optically Induced Mask-Controlled Time-Variable Periodic Microwave Structures", In IEEE Transactions on Microwave Theory and Techniques, vol. 48, Issue 5, May 2000, (6 pages total).

Srinivasan, Pradeep, "Design and Fabrication of Space Variant Micro Optical Elements", In Doctoral Dissertation, Retrieved on: Nov. 27, 2014, Available at: http://etd.fcla.edu/CF/CFE0002843/Srinivasan_Pradeep_200908_PhD.pdf (160 pages total).

Mirza, et al., "Key Challenges to Affordable See Through Wearable Displays: The Missing Link for Mobile AR Mass Deployment", In Proceedings of SPIE 8720, Photonic Applications for Aerospace, Commercial, and Harsh Environments IV, May 31, 2013, pp. 1-6. (6 pages total).

Levola, Tapani, "Diffractive Optics for Virtual Reality Displays", In Journal of the Society for Information Display, Dec. 2006, (1 page total).

Saarikko, Pasi, "Diffractive Exit-Pupil Expander with a Large Field of View", In Proceedings of Photonics in Multimedia II, 700105 SPIE 7001, Apr. 25, 2008, (3 Pages total).

Kimmel, Jyrki, "Mobile Display Backlight Light Guide Plates Based on Slanted Grating Arrays", In Proceedings of Journal of Photonics for Energy, vol. 2, Mar. 12, 2012, (1 Page total).

Levola, et al., "Replicated Slanted Gratings with a High Refractive Index Material for in and Outcoupling of Light", In Proceedings of Optics Express, vol. 15, Issue 5, Mar. 5, 2007, (8 pages total).

Yang, et al., "High-performance and Compact Binary Blazed Grating Coupler Based on an Asymmetric Subgrating Structure and Vertical Coupling", In Optics Letters, vol. 36, No. 14, Jul. 15, 2011, (5 pages total).

Todd, Michael D., "Fiber Optic Bragg Grating-Based Sensing", Published on: Jun. 15, 2012, Available at: http://www.sem.org/pdf/fiber_bragg_grating_sensing.pdf (36 pages total).

Zhang, et al., "Advances in Optical Fiber Bragg Grating Sensor Technologies", In Photonic Sensors, vol. 2, No. 1, Mar. 2012, (13 pages total).

Uranga, et al., "Focused Ion Beam Nano-structuring of Photonic Bragg Gratings in Al2o3 Waveguides", In Proceedings of 12th Annual Symposium IEEE/LEOS Benelux, Dec. 17, 2007, (4 pages total).

Cheng, et al., "Design of an Ultra-Thin Near-Eye Display with Geometrical Waveguide and Freeform Optics", In Proceedings of Optics Express, vol. 22, Issue 17, Aug. 2014, (15 pages total).

Wang, et al., "Guided-Mode Resonance in Planar Dielectric-Layer Diffraction Gratings", In Journal of Optics Infobase, vol. 7, Isuue 8, Aug. 1, 1990, (3 pages total).

Sentenac, et al., "Angular Tolerant Resonant Grating Filters under Oblique Incidence", Journal of Optics Soc. Am. A, vol. 22, No. 4, Mar. 2005, pp. 475-480 (6 pages total).

Powell, et al., "Novel Approach to Exit Pupil Expansion for Wearable Displays", In Proceeding of the SPIE 4711, Helmet- and Head-Mounted Displays VII, Aug. 5, 2002, (3 pages total).

Urey, et al, "Microlens Array-Based Exit Pupil Expander for Full-Color Display Applications", In Proceedings of SPIE in Photon Management, vol. 5456, Apr. 2004, (10 pages total).

Zhu, et , "Optical Image Encryption Based on Interference of Polarized Light", In Proceedings of Optics Express, vol. 17, No. 16, Jul. 20, 2009, (7 pages total).

"International Search Report and Written Opinion Issued in PCT Application No. PCT/US2016/052405", dated Dec. 21, 2016, (10 Pages total).

"International Search Report and Written Opinion Issued in PCT Application No. PCT/US2016/051563", dated Nov. 18, 2016, 10 Pages.

"International Search Report and Written Opinion Issued in PCT Application No. PCT/US2016/058332", dated Feb. 21, 2017, 14 Pages.

Saarikko, et al., "Diffractive Exit-pupil Expander for Spherical Light Guide Virtual Displays Designed for Near-Distance Viewing", In the Journal of Optics A: Pure and Applied Optics, vol. 11, Issue 6, Mar. 31, 2009, 10 Pages.

"Second Written Opinion Issued in PCT Application No. PCT/US2016/039706", dated Jun. 27, 2017, (5 Pages total).

"Second Written Opinion Issued in PCT Application No. PCT/US2016/039705", dated Jul. 10, 2017, (7 Pages total).

(56) References Cited

OTHER PUBLICATIONS

"Second Written Opinion Issued in PCT Application No. PCT/US2016/044947", dated Jul. 13, 2017, (8 Pages total).
"International Preliminary Report on Patentability Issued in PCT Application No. PCT/US2016/037460", Dated: Oct. 17, 2017, 7 Pages.

* cited by examiner

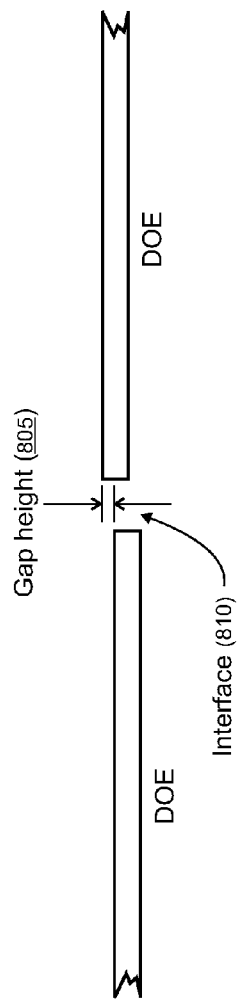
FIG 8
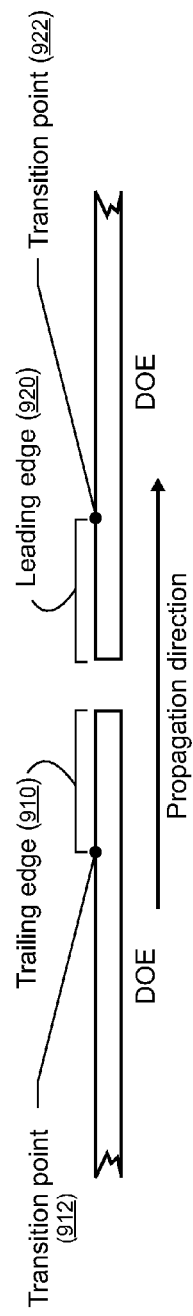
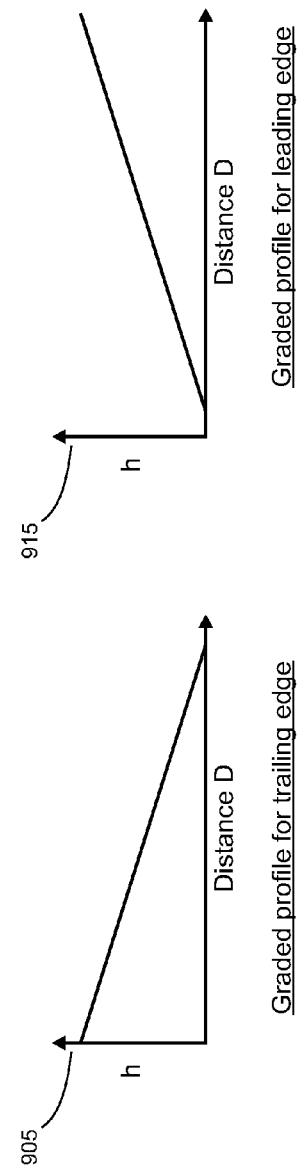
FIG 9

DIFFRACTIVE OPTICAL ELEMENTS WITH GRADED EDGES

BACKGROUND

Diffractive optical elements (DOEs) are optical elements with a periodic structure which are commonly utilized in applications ranging from bio-technology, material processing, sensing, and testing to technical optics and optical metrology. By incorporating DOEs in an optical field of a laser or emissive display, for example, the light's "shape" can be controlled and changed flexibly according to application needs.

SUMMARY

In an optical system that includes a waveguide with multiple diffractive optical elements (DOEs) incorporating diffraction gratings, light exiting a trailing edge of an upstream DOE enters a leading edge of a downstream DOE in the waveguide. One or more of the DOEs may include a leading and/or a trailing edge that have a graded profile. At a graded trailing edge of an upstream DOE, grating height smoothly decreases from full height to shallow height as a function of the proximity to the trailing edge. At a graded leading edge of the downstream DOE, grating height smoothly increases from shallow height to full height as a function of distance away from the leading edge. By reducing a sharp boundary at the interface between the upstream and downstream DOEs, the graded profiles applied to the DOE edges enable optical resolution to be maintained in the waveguide while decreasing sensitivity to misalignment between the DOEs that may occur during manufacturing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 8 shows an illustrative gap height at an interface between two DOEs disposed in a waveguide in an optical system;

FIG. 9 shows an illustrative interface between leading and trailing edges of respective DOEs in a waveguide and associated graded profiles;

Like reference numerals indicate like elements in the drawings. Elements are not drawn to scale unless otherwise indicated.

DETAILED DESCRIPTION

Figure 1:
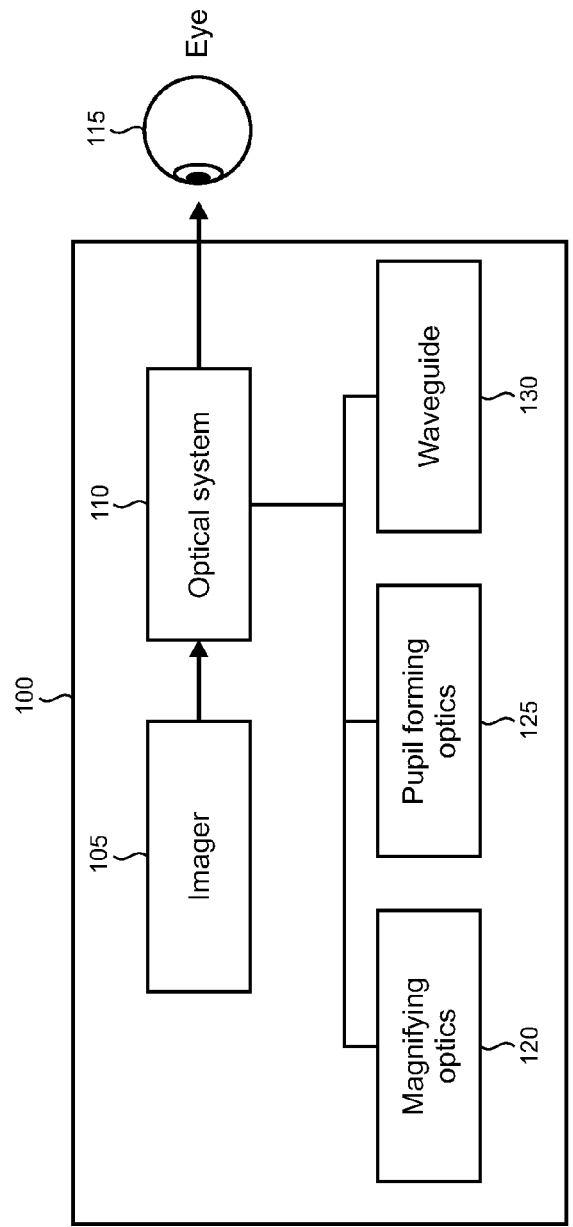
FIG. 1 shows a block diagram of an illustrative near eye display system which may incorporate the present diffractive optical elements (DOEs) with graded edges.

FIG. 1 shows a block diagram of an illustrative near eye display system 100 which may incorporate the present diffractive optical elements (DOEs) with graded edges. Near eye display systems are frequently used, for example, in head mounted display (HMD) devices in industrial, commercial, and consumer applications. Other devices and systems may also use DOEs having graded edges, as described below, and it is emphasized that the near eye display system 100 is intended to be an example that is used to illustrate various features and aspects, and the present DOEs are not necessarily limited to near eye display systems.

System 100 may include an imager 105 that works with an optical system 110 to deliver images as a virtual display to a user's eye 115. The imager 105 may include, for example, RGB (red, green, blue) light emitting diodes (LEDs), LCOS (liquid crystal on silicon) devices, OLED (organic light emitting diode) arrays, MEMS (micro-electro mechanical system) devices, or any other suitable displays or micro-displays operating in transmission, reflection, or emission. The imager 105 may also include mirrors and other components that enable a virtual display to be composed and provide one or more input optical beams to the optical system. The optical system 110 can typically include magnifying optics 120, pupil forming optics 125, and one or more waveguides 130.

In a near eye display system the imager does not actually shine the images on a surface such as glass lenses to create the visual display for the user. This is not feasible because the human eye cannot focus on something that is that close. Indeed, rather than create a visible image on a surface, the near eye display system 100 uses the pupil forming optics 125 to form a pupil and the eye 115 acts as the last element in the optical chain and converts the light from the pupil into an image on the eye's retina as a virtual display.

Figure 2:
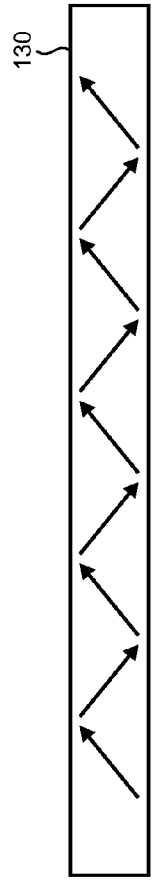
FIG. 2 shows propagation of light in a waveguide by total internal reflection.

The waveguide 130 facilitates light transmission between the imager and the eye. One or more waveguides can be utilized in the near eye display system because they are transparent and because they are generally small and lightweight (which is desirable in applications such as HMD devices where size and weight is generally sought to be minimized for reasons of performance and user comfort). For example, the waveguide 130 can enable the imager 105 to be located out the way, for example, on the side of the head, leaving only a relatively small, light, and transparent waveguide optical element in front of the eyes. In one implementation, the waveguide 130 operates using a principle of total internal reflection, as shown in FIG. 2, so that light can be coupled among the various optical elements in the system 100.

Figure 3:
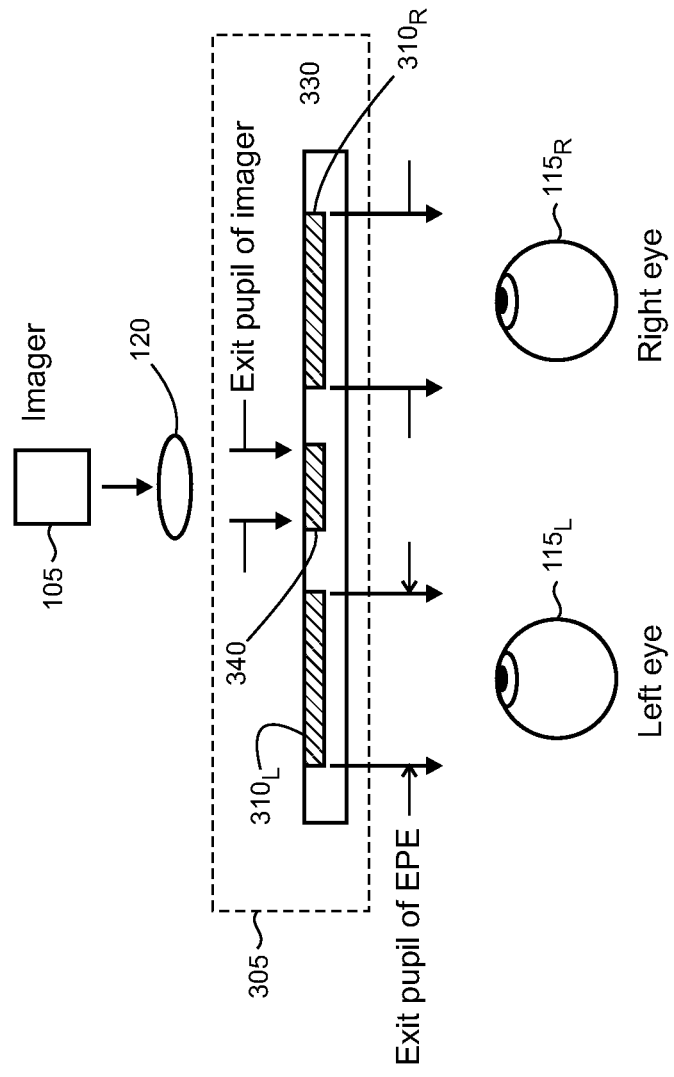
FIG. 3 shows a view of an illustrative exit pupil expander.

FIG. 3 shows a view of an illustrative exit pupil expander (EPE) 305. EPE 305 receives an input optical beam from the imager 105 through magnifying optics 120 to produce one or more output optical beams with expanded exit pupil in one or two dimensions relative to the exit pupil of the imager (in general, the input may include more than one optical beam which may be produced by separate sources). While the EPE 305 is depicted as having a planar configuration, other shapes may also be utilized including, for example, partially spherical shapes. The expanded exit pupil typically facilitates a virtual display to be sufficiently sized to meet the various design requirements of a given optical system, such as image resolution, field of view, and the like, while enabling the imager and associated components to be relatively light and compact.

The EPE 305 is configured, in this illustrative example, to support binocular operation for both the left and right eyes (components which may be utilized for stereoscopic operation such as scanning mirrors, lenses, filters, beam splitters, MEMS devices, or the like are not shown in FIG. 3 for sake of clarity in exposition). Accordingly, the EPE 305 utilizes two out-coupling gratings, $310_L$ and $310_R$ that are supported on a waveguide 330 and a central in-coupling grating 340. The in-coupling and out-coupling gratings may be configured using multiple DOEs, as described in the illustrative example below.

Figure 4:
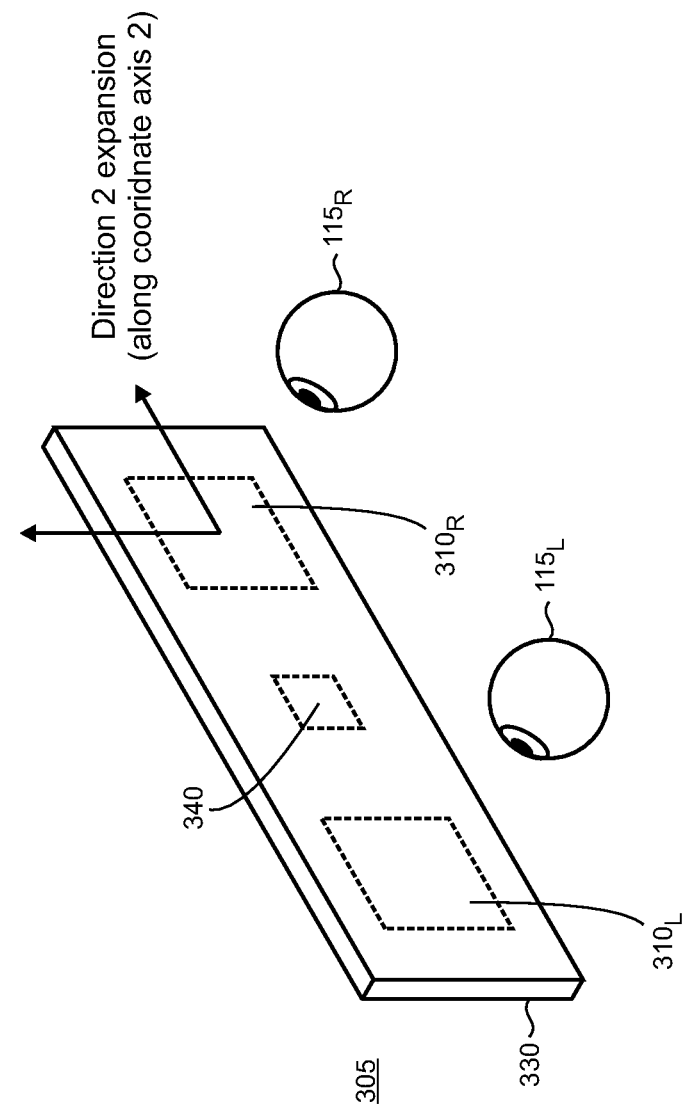
FIG. 4 shows a view of the illustrative exit pupil expander in which the exit pupil is expanded along two directions.

As shown in FIG. 4, the EPE 305 may be configured to provide an expanded exit pupil in two directions (i.e., along each of a first and second coordinate axis). As shown, the exit pupil is expanded in both the vertical and horizontal directions. It may be understood that the terms "direction," "horizontal," and "vertical" are used primarily to establish relative orientations in the illustrative examples shown and described herein for ease of description. These terms may be intuitive for a usage scenario in which the user of the near eye display device is upright and forward facing, but less intuitive for other usage scenarios. Accordingly, the listed terms are not to be construed to limit the scope of the configurations (and usage scenarios therein) of the present DOEs with graded edges.

Figure 5:
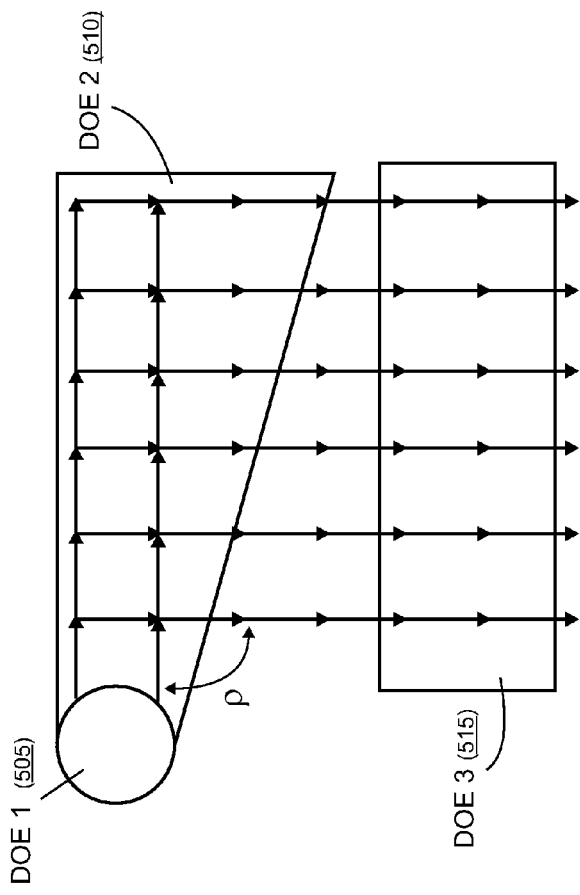
FIG. 5 shows an illustrative arrangement of three DOEs.

FIG. 5 shows an illustrative arrangement of three DOEs that may be used as part of a waveguide to provide in-coupling and expansion of the exit pupil in two directions. Each DOE is an optical element comprising a periodic structure that can modulate various properties of light in a periodic pattern such as the direction of optical axis, optical path length, and the like. The first DOE, DOE 1 (indicated by reference numeral 505), is configured to couple the beam from the imager into the waveguide. The second DOE, DOE 2 (510), expands the exit pupil in a first direction along a first coordinate axis, and the third DOE, DOE 3 (515), expands the exit pupil in a second direction along a second coordinate axis and couples light out of the waveguide. The angle ρ is a rotation angle between the periodic lines of DOE 2 and DOE 3 as shown. DOE 1 thus functions as an in-coupling grating and DOE 3 functions as an out-coupling grating while expanding the pupil in one direction. DOE 2 may be viewed as an intermediate grating that functions to couple light between the in-coupling and out-coupling gratings while performing exit pupil expansion in the other direction. Using such intermediate grating may eliminate a need for conventional functionalities for exit pupil expansion in an EPE such as collimating lenses.

Figure 7:
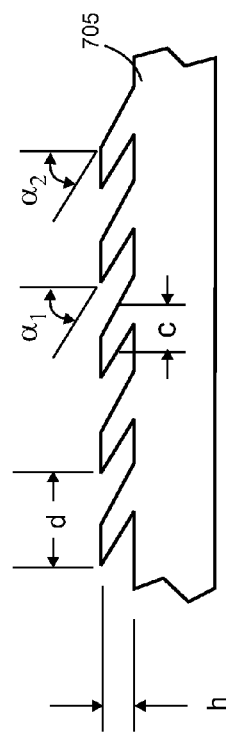
FIG. 7 shows a portion of an illustrative diffraction grating that has slanted gratings.
Figure 6:
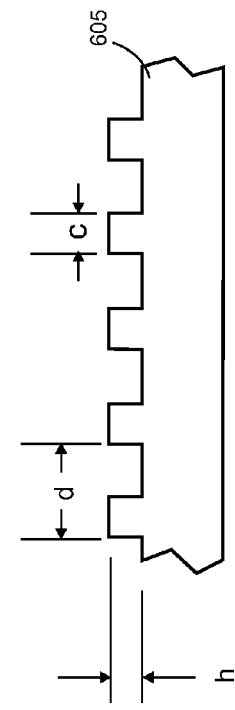
FIG. 6 shows a portion of an illustrative diffraction grating that has straight gratings.

As shown in FIGS. 6 and 7, respectively, the DOEs 505, 510, and 515 can be configured using straight (i.e., non-slanted) grating features 600 (typically referred to as grating bars or simply "gratings"), that are formed in a substrate 605, or using slanted grating features 700 formed in a substrate 705. The grating period is represented by d, the grating height by h, bar width by c, and the filling factor by f. The slanted grating features may be described by slant angles $\alpha_1$ and $\alpha_2$. In one exemplary embodiment, for the non-graded portions of DOE 1, d=390 nm, c=d/2, h=300 nm, $\alpha_1=\alpha_2=250$ degrees, f=0.5 c, and the refractive index of the substrate material is approximately 1.71. In other implementations, ranges of suitable values may include d=250 nm-450 nm, h=200 nm-400 nm, f=0.3-0, and $\alpha_1=30$-50 degrees, with refractive indices of 1.7 to 1.9.

As discussed above, the DOE structures contain submicron features and the optical wavelength in the waveguide is relatively small, for example, on the order of 250-400 nm. As a result, discontinuities between the surfaces of the DOEs can have a large impact on optical resolution, for example, as measured by MTF (modulation transfer function). As shown in FIG. 8, a small gap height 805 at the interface between the DOEs (as indicated by reference numeral 810) relative to the grating height can negatively impair optical resolution. Such impairment may reduce the functionality of a near eye display system in which the DOEs are used and/or result in vestibular discomfort for a near eye system user in some cases. For example, a gap height of 5 nm can decrease optical resolution by as much 50% in some cases. The grating features in a DOE can also behave as aperture features which may introduce undesirable phase changes in the light as it propagates between DOEs.

Accordingly, the manufacturing processes used for conventional DOEs typically needs to be highly accurate so that nanometer level variations in grating height do not occur. Such level of accuracy may imply that the measurement accuracy used for characterization and quality control, for example, may need to be on the order of 0.5 nm. Tools having such accuracy are generally unavailable in manufacturing environments, particularly for volume production.

The DOEs 505, 510, and 515 with graded edges facilitate increased tolerance for gap height mismatch in manufacturing while still maintaining a desired optical resolution. For example, as shown in FIG. 9, a graded profile 905 which maps grating height as a function of distance D may be applied to a trailing edge of a DOE (e.g., DOE 1). The trailing edge is at the end of the DOE at which propagating light exits the grating and is indicated by reference numeral 910. The edge 910 may typically encompass some portion of the DOE that is adjacent to the interface between the DOEs as shown in FIG. 9. At some transition point 912 upstream from the trailing edge, the grating height h is decreased from a full height so that the grating becomes increasingly shallow (i.e., grating height is reduced) as distance to the trailing edge decreases.

Figure 10:
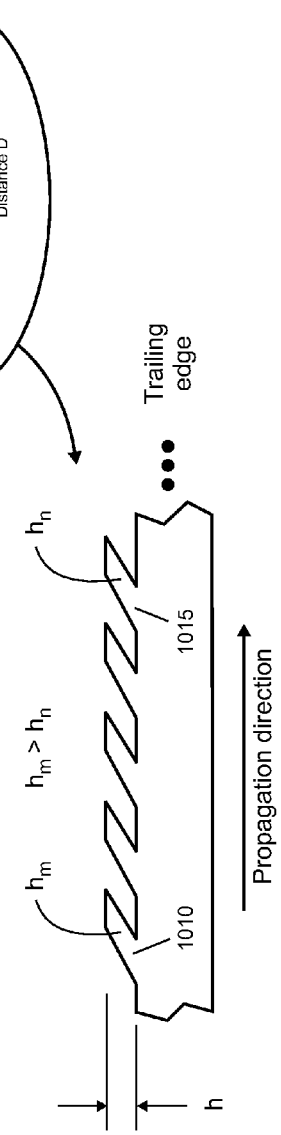
FIG. 10 shows illustrative dimensions of gratings having a graded profile at a trailing edge of a DOE.

A representative portion of the DOE to which the graded profile 905 is applied is shown in FIG. 10. While slanted gratings are shown in FIG. 10, it is emphasized that the illustrated concepts are equally applicable to straight gratings. As shown, the height of respective grating bars in the DOE is reduced to become more shallow in the direction of propagation so that the $m^{th}$ grating bar 1010 has a greater height than that of the $n^{th}$ grating bar 1015. In some implementations, the height is reduced to zero or near zero at or near the point of interface with the next DOE (e.g., DOE 2). That is, the gratings may become so small that they transition into a smooth surface. However, non-zero values at or near such interface may also be utilized in some implementations. While "near" is a relative term, it will be appreciated that various values for the smallest grating height and its location relative to the trailing edge may be utilized for a given implementation while still achieving a target optical resolution and increased tolerance for height mismatch in manufacturing. In addition, given that the heights discussed herein are in the submicron range, terms such as "near zero" are used in recognition, as discussed above, that characterization of very small grating heights is not generally possible using tools available in a manufacturing environment.

The illustrative graded profile 905 applies an approximately linear curve to a portion of a DOE at its trailing edge in which grating bars are smoothly reduced in height in order to avoid any abrupt or sudden transition to the downstream DOE. However, non-linear curves may also be used for the graded profile 905 in some implementations. For example, the graded profile may be stepped so that groups of grating bars share the same height, and a downstream group of grating bars have decreased height relative to an upstream group. The particular upstream point of transition 912 in the DOE from full height gratings to the decreasing height gratings (and accordingly, the slope of the graded curve) can vary by implementation and may depend on target optical characteristics and the configuration of the DOE including size and shape, and grating attributes such as height, refractive index, fill ratio, and configuration (i.e., whether straight or slanted grating bars), for example.

Returning to FIG. 9, a graded profile 915 may be applied to a leading edge of a DOE (e.g., DOE 2) as indicated by reference numeral 920. The leading edge is located at the end of the DOE at which propagating light enters the grating. At or near the leading edge, or at some point upstream from the leading edge, the grating height h is increased from shallow height to full height so that the grating becomes increasingly deep as the distance away from the leading edge increases.

As with the graded profile 905, the graded profile 915 may be approximately linear in typical implementations, but non-linear profiles may also by utilized in other implementations. The particular downstream point of transition 922 in the DOE from shallow to full height grating bars (and accordingly the slope of the graded curve) can vary by implementation.

Figure 11:
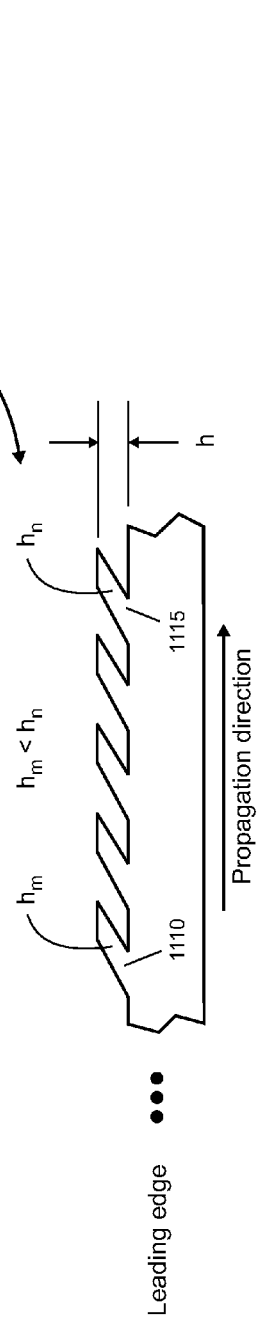
FIG. 11 shows illustrative dimensions of gratings having a graded profile at a leading edge of a DOE.

A representative portion of the DOE to which the graded profile 915 applied is shown in FIG. 11. While straight gratings are shown in FIG. 11, it is emphasized that the illustrated concepts are equally applicable to slanted gratings. As shown, the height of respective gratings in the DOE is increased in the direction of propagation so that the $n^{th}$ grating bar 1115 has a greater height than that of the $m^{th}$ grating bar 1110. Typically, the height is increased from zero or near zero at or near the point of interface with the upstream DOE (e.g., DOE 1). However, non-zero starting values for grating height at or near such interface may also be utilized in some implementations. For example, the leading edge may include a smooth surface adjacent to the interface between the DOEs that transitions to full height gratings, while in other implementations, the leading edge can start with shallow gratings.

The graded profiles for respective leading and trailing edges of the DOEs may be applied to both the transition between DOE 1 and DOE 2 (i.e., the in-coupling grating and the intermediate grating that expands the exit pupil in the first direction) as well as the transition between DOE 2 and DOE 3 (in which DOE 3 expands the exit pupil in the second direction). However, in some implementations in which DOE 3 is configured as an apodized grating (i.e., a grating in which the grating's modulation index gradually increases and then decreases along the length of the grating), portions or all of the grating may already be sufficiently shallow to ensure a smooth transition from DOE 2 without application of the graded profile.

Figure 12:
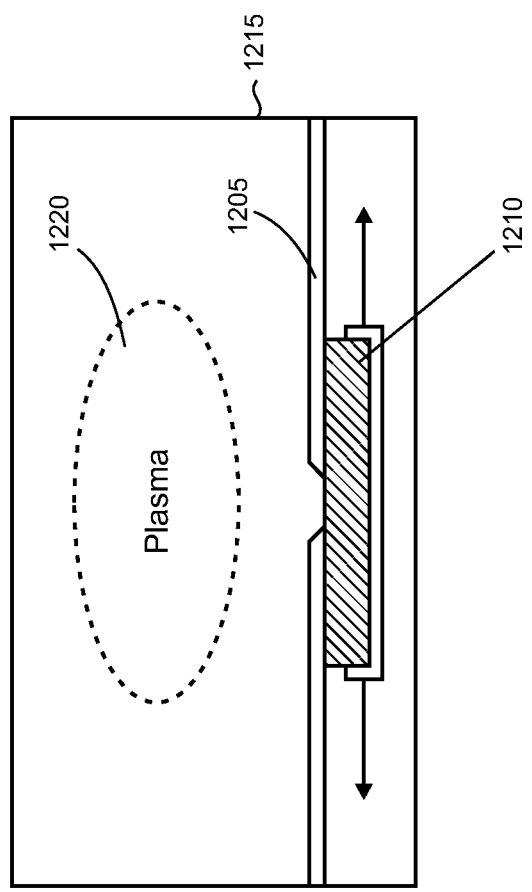
FIG. 12 shows an illustrative arrangement for DOE fabrication using a mask that moves relative to a substrate.

FIG. 12 shows an illustrative arrangement for DOE fabrication using a mask 1205 that moves relative to a photosensitive grating substrate 1210 within an enclosure 1215. A reactive ion etching plasma 1220 is used to adjust the thickness of the etching on the grating substrate at various positions by moving the substrate relative to mask using, for example, a computer-controller stepper functionality or other suitable control system. In an illustrative example, the etching may be performed using a reactive ion beam etching (RIBE). However, other variations of ion beam etching may be utilized in various implementations including, for example, such as magnetron reactive ion etching (MRIE), high density plasma etching (HDP), transformer coupled plasma etching (TCP), inductively coupled plasma etching (ICP), and electron resonance plasma etching (ECR).

By controlling the exposure of the substrate to the plasma through the mask aperture, grating depth can be varied as a function of position over the extent of the substrate to thereby enable the above-described graded profiles to be incorporated on the substrate. The resulting microstructure on the substrate may be replicated for mass production in a lightweight polymer material using one of cast-and-cure, embossing, compression molding, or compression injection molding, for example.

Figure 13:
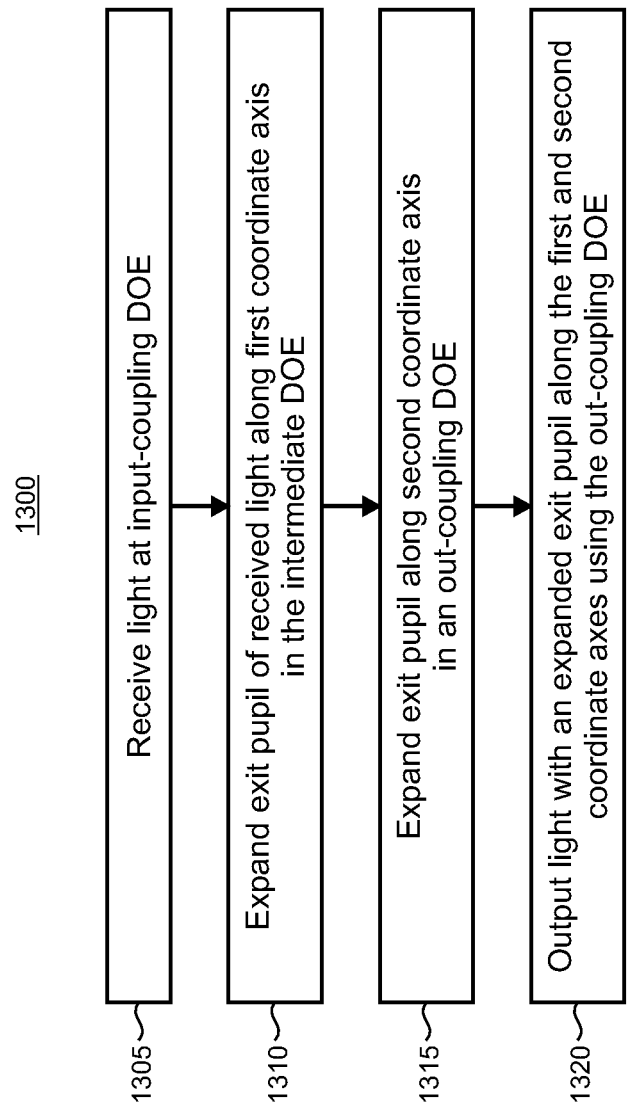
FIG. 13 shows an illustrative method.

FIG. 13 is a flowchart 13 of an illustrative method 1300. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1305, light is received at an in-coupling DOE. The in-coupling grating is disposed in an EPE and is configured with a graded trailing edge, as described above, on which full height gratings smoothly transition to a smooth surface near the interface with the downstream intermediate DOE that is disposed in the EPE. In step 1310, the exit pupil of the received light is expanded along a first coordinate axis in the intermediate DOE. The intermediate DOE is configured with a graded leading edge on which a smooth surface near the interface smoothly transitions to full height gratings.

In step 1315, the exit pupil is expanded in an out-coupling DOE which outputs light with an expanded exit pupil relative to the received light at the in-coupling DOE along the first and second coordinate axes in step 1320. The intermediate DOE is configured with a graded trailing edge on which full height gratings smoothly transition to a smooth surface near the interface with the downstream out-coupling DOE. In some implementations, the out-coupling DOE may also be configured with a graded leading edge that receives light coupled from the intermediate DOE. In other implementations, the out-coupling may be apodized and have sufficiently shallow gratings that application of a graded profile to its leading edge may be unnecessary.

Figure 14:
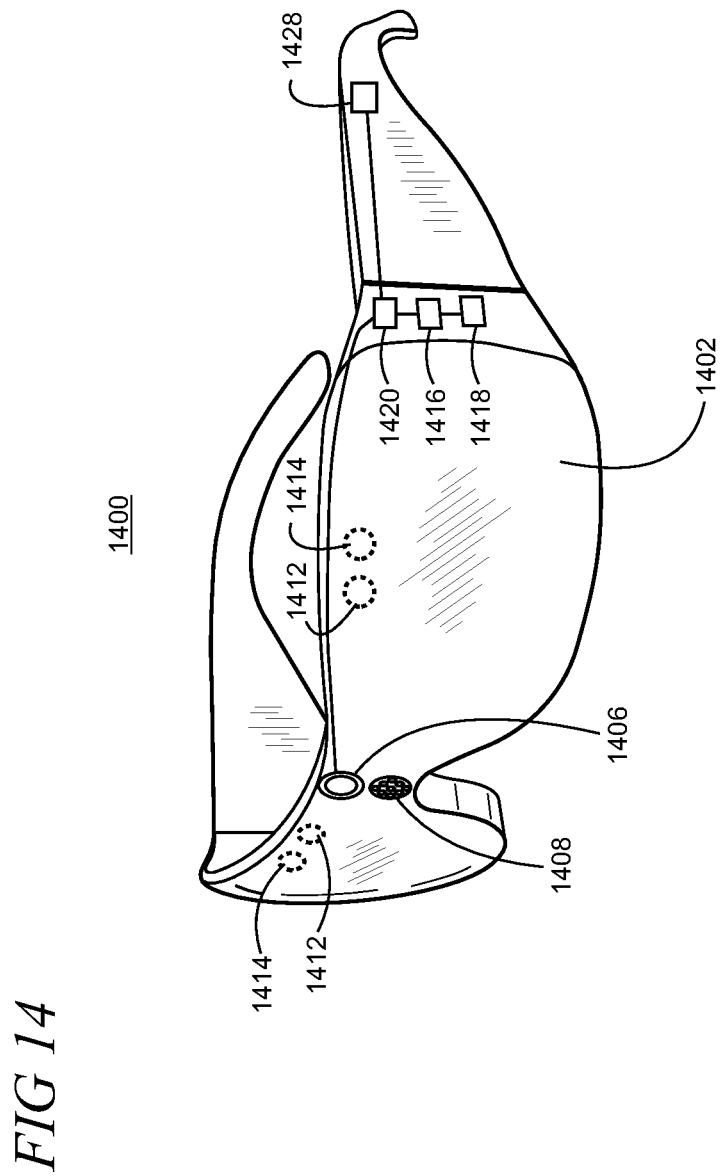
FIG. 14 is a pictorial view of an illustrative example of a virtual reality or mixed reality head mounted display (HMD) device.
Figure 15:
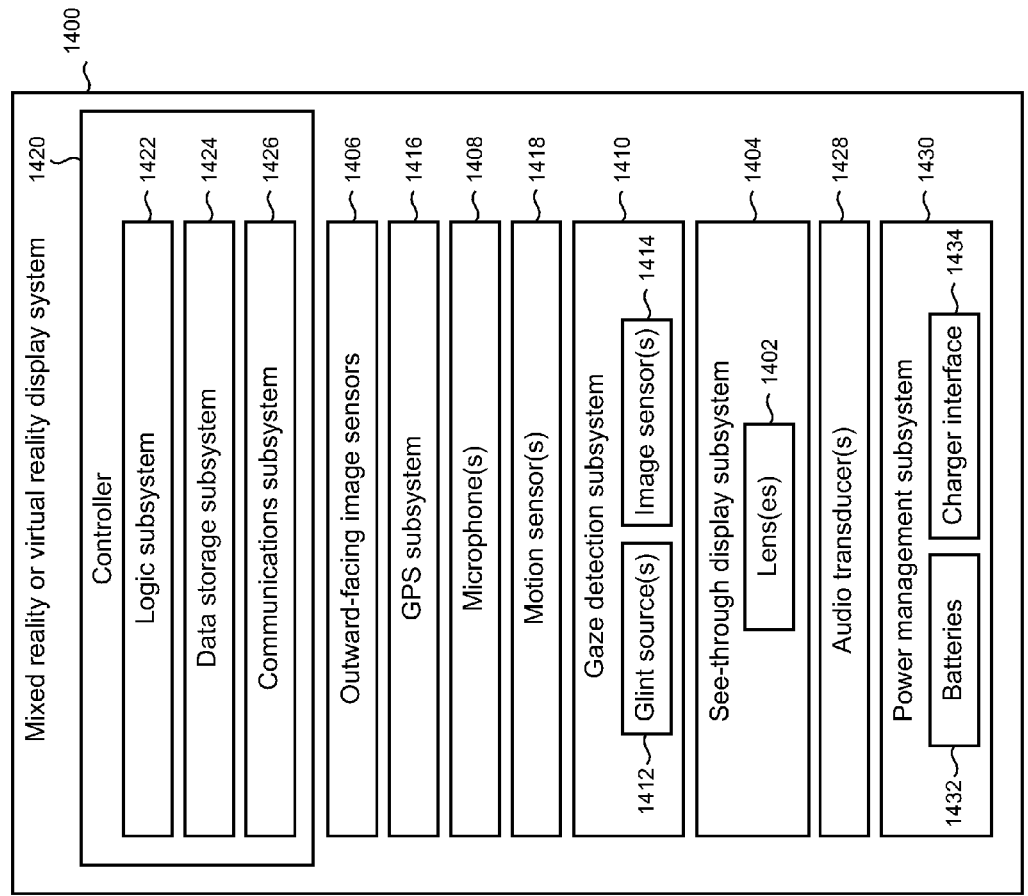
FIG. 15 shows a block diagram of an illustrative example of a virtual reality or mixed reality HMD device.

DOEs with graded edges may be incorporated into a display system that is utilized in a virtual or mixed reality display device. Such device may take any suitable form, including but not limited to near-eye devices such as an HMD device. A see-through display may be used in some implementations while an opaque (i.e., non-see-through) display using a camera-based pass-through or outward facing sensor, for example, may be used in other implementations. FIG. 14 shows one particular illustrative example of a see-through, mixed reality or virtual reality display system 1400, and FIG. 15 shows a functional block diagram of the system 1400. Display system 1400 comprises one or more lenses 1402 that form a part of a see-through display subsystem 1404, such that images may be displayed using lenses 1402 (e.g. using projection onto lenses 1402, one or more waveguide systems incorporated into the lenses 1402, and/or in any other suitable manner). Display system 1400 further comprises one or more outward-facing image sensors 1406 configured to acquire images of a background scene and/or physical environment being viewed by a user, and may include one or more microphones 1408 configured to detect sounds, such as voice commands from a user. Outward-facing image sensors 1406 may include one or more depth sensors and/or one or more two-dimensional image sensors. In alternative arrangements, as noted above, a mixed reality or virtual reality display system, instead of incorporating a see-through display subsystem, may display mixed reality or virtual reality images through a viewfinder mode for an outward-facing image sensor.

The display system 1400 may further include a gaze detection subsystem 1410 configured for detecting a direction of gaze of each eye of a user or a direction or location of focus, as described above. Gaze detection subsystem 1410 may be configured to determine gaze directions of each of a user's eyes in any suitable manner. For example, in the illustrative example shown, a gaze detection subsystem 1410 includes one or more glint sources 1412, such as infrared light sources, that are configured to cause a glint of light to reflect from each eyeball of a user, and one or more image sensors 1414, such as inward-facing sensors, that are configured to capture an image of each eyeball of the user. Changes in the glints from the user's eyeballs and/or a location of a user's pupil, as determined from image data gathered using the image sensor(s) 1414, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1410 may have any suitable number and arrangement of light sources and image sensors. In some implementations, the gaze detection subsystem 1410 may be omitted.

The display system 1400 may also include additional sensors. For example, display system 1400 may comprise a global positioning system (GPS) subsystem 1416 to allow a location of the display system 1400 to be determined. This may help to identify real world objects, such as buildings, etc. that may be located in the user's adjoining physical environment.

The display system 1400 may further include one or more motion sensors 1418 (e.g., inertial, multi-axis gyroscopic, or acceleration sensors) to detect movement and position/orientation/pose of a user's head when the user is wearing the system as part of a mixed reality or virtual reality HMD device. Motion data may be used, potentially along with eye-tracking glint data and outward-facing image data, for gaze detection, as well as for image stabilization to help correct for blur in images from the outward-facing image sensor(s) 1406. The use of motion data may allow changes in gaze location to be tracked even if image data from outward-facing image sensor(s) 1406 cannot be resolved.

In addition, motion sensors 1418, as well as microphone(s) 1408 and gaze detection subsystem 1410, also may be employed as user input devices, such that a user may interact with the display system 1400 via gestures of the eye, neck and/or head, as well as via verbal commands in some cases. It may be understood that sensors illustrated in FIGS. 14 and 15 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1400 can further include a controller 1420 having a logic subsystem 1422 and a data storage subsystem 1424 in communication with the sensors, gaze detection subsystem 1410, display subsystem 1404, and/or other components through a communications subsystem 1426. The communications subsystem 1426 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1424 may include instructions stored thereon that are executable by logic subsystem 1422, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1400 is configured with one or more audio transducers 1428 (e.g., speakers, earphones, etc.) so that audio can be utilized as part of a mixed reality or virtual reality experience. A power management subsystem 1430 may include one or more batteries 1432 and/or protection circuit modules (PCMs) and an associated charger interface 1434 and/or remote power interface for supplying power to components in the display system 1400.

It may be appreciated that the display system 1400 is described for the purpose of example, and thus is not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 16:
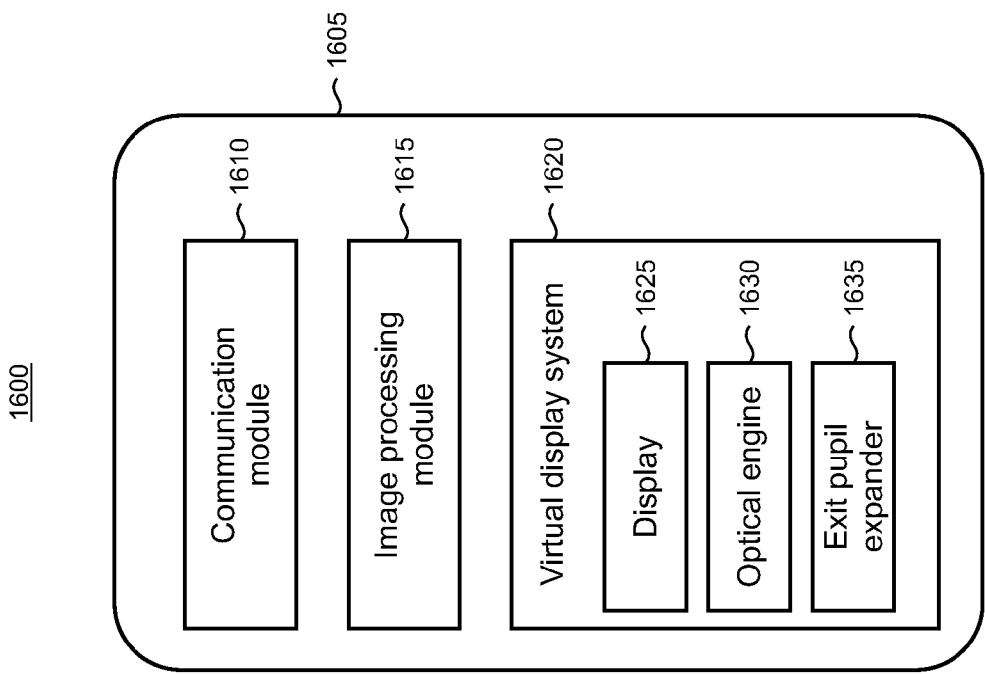
FIG. 16 shows a block diagram of an illustrative electronic device that incorporates an exit pupil expander.

As shown in FIG. 16, an EPE incorporating the present DOEs with graded edges can be used in a mobile or portable electronic device 1600, such as a mobile phone, smartphone, personal digital assistant (PDA), communicator, portable Internet appliance, hand-held computer, digital video or still camera, wearable computer, computer game device, specialized bring-to-the-eye product for viewing, or other portable electronic device. As shown, the portable device 1600 includes a housing 1605 to house a communication module 1610 for receiving and transmitting information from and to an external device, or a remote system or service (not shown).

The portable device 1600 may also include an image processing module 1615 for handling the received and transmitted information, and a virtual display system 1620 to support viewing of images. The virtual display system

1620 can include a micro-display or an imager 1625 and an optical engine 1630. The image processing module 1615 may be operatively connected to the optical engine 1630 to provide image data, such as video data, to the imager 1625 to display an image thereon. An EPE 1635 using one or more DOEs with graded edges can be optically linked to an optical engine 1630.

An EPE using one or more DOEs with graded edges may also be utilized in non-portable devices, such as a gaming devices, multimedia consoles, personal computers, vending machines, smart appliances, Internet-connected devices, and home appliances, such as an oven, microwave oven and other appliances, and other non-portable devices.

Various exemplary embodiments of the present diffractive optical elements with graded edges are now presented by way of illustration and not as an exhaustive list of all embodiments. An example includes an optical system, comprising: a substrate of optical material; a first diffractive optical element (DOE) disposed on the substrate and configured as an in-coupling grating to receive, as an input, one or more optical beams that propagate in the first DOE and exit at a trailing edge of the first DOE; and a second DOE disposed on the substrate and configured for pupil expansion of the one or more optical beams along a first direction, in which the trailing edge of the first DOE is located on the substrate at an interface with the second DOE, wherein the one or more optical beams exiting at the trailing edge, enter a leading edge of the second DOE, and wherein the trailing edge and leading edge are graded so that a grating height of each of the first DOE and the second DOE increases as a function of distance from the interface.

In another example, the optical system further includes a third DOE disposed on the substrate and configured for pupil expansion of the optical beams along a second direction, and further configured as an out-coupling grating to couple, as an output from the substrate, one or more optical beams with expanded pupil relative to the input. In another example, the grating height in the first DOE decreases approximately linearly from a full height upstream from the trailing edge to a shallow height at the trailing edge of the first DOE. In another example, the grating height in the first DOE decreases approximately linearly from a full height upstream from the trailing edge to zero height at the trailing edge of the first DOE. In another example, the grating height in the second DOE increases approximately linearly from a shallow height at the leading edge to a full height downstream from the leading edge. In another example, either the first DOE or second DOE is a straight diffraction grating or a slanted diffraction grating. In another example, the one or more optical beams received as the input emanate as a virtual image produced by a micro-display or imager.

A further example includes an electronic device, comprising: a data processing unit; an optical engine operatively connected to the data processing unit for receiving image data from the data processing unit; an imager operatively connected to the optical engine to form images based on the image data and to generate one or more input optical beams incorporating the images; and an exit pupil expander, responsive to the one or more input optical beams, comprising a structure on which multiple diffractive optical elements (DOEs) are disposed, in which the exit pupil expander is configured to provide one or more output optical beams, using one or more of the DOEs, as one or more near eye virtual displays with an expanded exit pupil, and in which light enters at a leading edge of a DOE and exits at a trailing edge of a DOE and at least one of the DOEs has a portion with a graded profile so that grating height linearly increases as a function of distance from the leading edge or the trailing edge over the portion.

In another example, the exit pupil expander provides pupil expansion in two directions. In another example, the structure comprises a waveguide. In another example, the imager includes one of light emitting diode, liquid crystal on silicon device, organic light emitting diode array, or microelectro mechanical system device. In another example, the imager comprises a micro-display operating in one of transmission, reflection, or emission. In another example, the electronic device is implemented in a head mounted display device or portable electronic device. In another example, each of the one or more input optical beams is produced by a corresponding one or more sources.

A further example includes a method, comprising: receiving light at an input-coupling diffractive optical element (DOE) disposed in an exit pupil expander; expanding an exit pupil of the received light along a first coordinate axis in an intermediate DOE disposed in the exit pupil expander; expanding the exit pupil along a second coordinate axis in an output-coupling DOE disposed in the exit pupil expander; and outputting light with an expanded exit pupil relative to the received light at the input-coupling DOE along the first and second coordinate axes using the output-coupling DOE, in which light exits the input-coupling DOE at a first graded trailing edge on which full height gratings transition to a smooth surface on the input-coupling DOE adjacent to a first interface between the in-coupling DOE and the intermediate DOE, and in which light exiting the input-coupling DOE enters the intermediate DOE at a graded leading edge on which a smooth surface on the intermediate DOE adjacent to the first interface transitions to full height gratings, and in which light exits the intermediate DOE at a second graded trailing edge on which full height gratings transition to a smooth surface on the intermediate DOE adjacent to a second interface between the intermediate DOE and the out-coupling DOE.

In another example, the transitions are gradual to minimize discontinuity at the interface so as to reduce impairment of optical resolution or reduce phase change in light coupled between the in-coupling DOE and intermediate DOE or between the intermediate DOE and the out-coupling DOE. In another example, the input-coupling DOE, the intermediate DOE, or the output-coupling DOE is formed with a polymer that is molded from a substrate that is etched using ion beam etching with a moving mask. In another example, at least a portion of the out-coupling DOE is an apodized diffraction grating having shallow grooves relative to the input-coupling DOE or the intermediate DOE. In another example, the method is performed in a near eye optical system. In another example, the output light provides a virtual display to a user of the near eye optical system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. An optical system, comprising:
a substrate of optical material configured as a waveguide;
a first diffractive optical element (DOE) disposed on the waveguide and configured as an in-coupling grating to receive, as an input, one or more optical beams that propagate in the first DOE and exit at a trailing edge of the first DOE; and a second DOE disposed on the waveguide and configured for pupil expansion of the one or more optical beams along a first direction,
in which the trailing edge of the first DOE is located on the waveguide at an interface with a leading edge of the second DOE, wherein the one or more optical beams exiting at the trailing edge, enter at the leading edge of the second DOE, and
wherein the trailing edge and leading edge are graded so that a grating height of each of the first DOE and the second DOE increases as a function of distance from the interface, and wherein the grating height increases linearly as a function from the distance from the interface so that profiles of the graded leading and trailing edges are wedge-shaped.

2. The optical system of claim 1 further including a third DOE disposed on the waveguide and configured for pupil expansion of the optical beams along a second direction, and further configured as an out-coupling grating to couple, as an output from the waveguide, one or more optical beams with expanded pupil relative to the input.

3. The optical system of claim 1 in which the grating height in the first DOE decreases approximately linearly from a full height upstream from the trailing edge to a shallow height at the trailing edge of the first DOE.

4. The optical system of claim 1 in which the grating height in the first DOE decreases approximately linearly from a full height upstream from the trailing edge to zero height at the trailing edge of the first DOE.

5. The optical system of claim 1 in which the grating height in the second DOE increases approximately linearly from a shallow height at the leading edge to a full height downstream from the leading edge.

6. The optical system of claim 1 in which either the first DOE or second DOE is a straight diffraction grating or a slanted diffraction grating.

7. The optical system of claim 1 in which the one or more optical beams received as the input emanate as a virtual image produced by a micro-display or imager.

8. The optical system of claim 1, wherein ends opposite the trailing edge and leading edge of the first and second DOEs, respectively, have gratings of a greater height than at the respective trailing and leading edges.

* * * * *